United States Patent [19]

Glassner

[11] Patent Number: 5,305,430
[45] Date of Patent: Apr. 19, 1994

[54] OBJECT-LOCAL SAMPLING HISTORIES FOR EFFICIENT PATH TRACING

[75] Inventor: Andrew S. Glassner, Mountain View, Calif.

[73] Assignee: Xerox Corporation, Stamford, Conn.

[21] Appl. No.: 633,660

[22] Filed: Dec. 26, 1990

[51] Int. Cl.⁵ .............................................. G06F 15/72
[52] U.S. Cl. .................... 395/127; 395/126; 395/120; 395/129
[58] Field of Search ............... 395/133, 127, 126, 123, 395/121, 120

[56] References Cited

U.S. PATENT DOCUMENTS

| | | | |
|---|---|---|---|
| 3,665,408 | 5/1972 | Erdahl et al. | 340/172.5 |
| 4,475,104 | 10/1984 | Shen | 340/729 |
| 4,609,917 | 9/1986 | Shen | 340/729 |
| 4,709,231 | 11/1987 | Sakaibara et al. | 340/729 |
| 4,730,261 | 3/1988 | Smith | 364/521 |

OTHER PUBLICATIONS

Whitted, Graphics and Image Processing, "An Improved Model for Shaded Display", Jun. 1980, vol. 23, #6.
Arvo et al., "Fast Ray Tracing by Ray Classification", Computer Graphics, vol. 21, #4, Jul. 1987.
Glassner, Doctoral Thesis, "Algorithms for Efficient Image Synthesis", Jul. 1988, University of North Carolina at Chapel Hill.
Workshop, Spring 1987, "Computer Human Interaction (CHI)—Graphics Interface (GI) Workshop on Rendering Algorithms and Systems", No Published Proceedings.

*Primary Examiner*—Gary V. Harkcom
*Assistant Examiner*—Mike Smith
*Attorney, Agent, or Firm*—Anglin & Giaccherini

[57] ABSTRACT

A method for constructing object-local sampling histories for efficient path tracing. The present invention provides a technique for efficiently producing computer generated two-dimensional synthetic images of three-dimensional scenes. Objects within in the scene (10) are assigned packs (30,36) containing one or more elements (32,38). For light reflective objects (19,O1), each element (32) of the object's pack (30) represents a region of the object's reflection hemisphere (30) through which incident light is equally likely to be reflected. For light transmissive objects (19,O1), the elements (32) represent analogous regions of equal transmission. For light emitting objects (L1), each element (38) of the object's pack (36) represents a region of equal light emission probability. In a recursive ray or path tracing algorithm, the pack (30,26) of each object (O1,L1) is interrogated to provide unused elements (32a,38a) corresponding to directional regions for sending transmitted (T1) or reflected (R1) backward-going rays, or for emitting illumination rays (I1). As each unused element (32a,38a) of an object's pack (30,36) is used, that element is marked as unavailable (32b,38b) until are elements are marked, when all elements are then unmarked (32a,38a) and the element selection process continues. The methods of the present invention insure that rays are directed through the scene in an image synthesis algorithm in directions most important for scene reconstruction, but ensuring that full coverage of all directions is maintained.

14 Claims, 10 Drawing Sheets

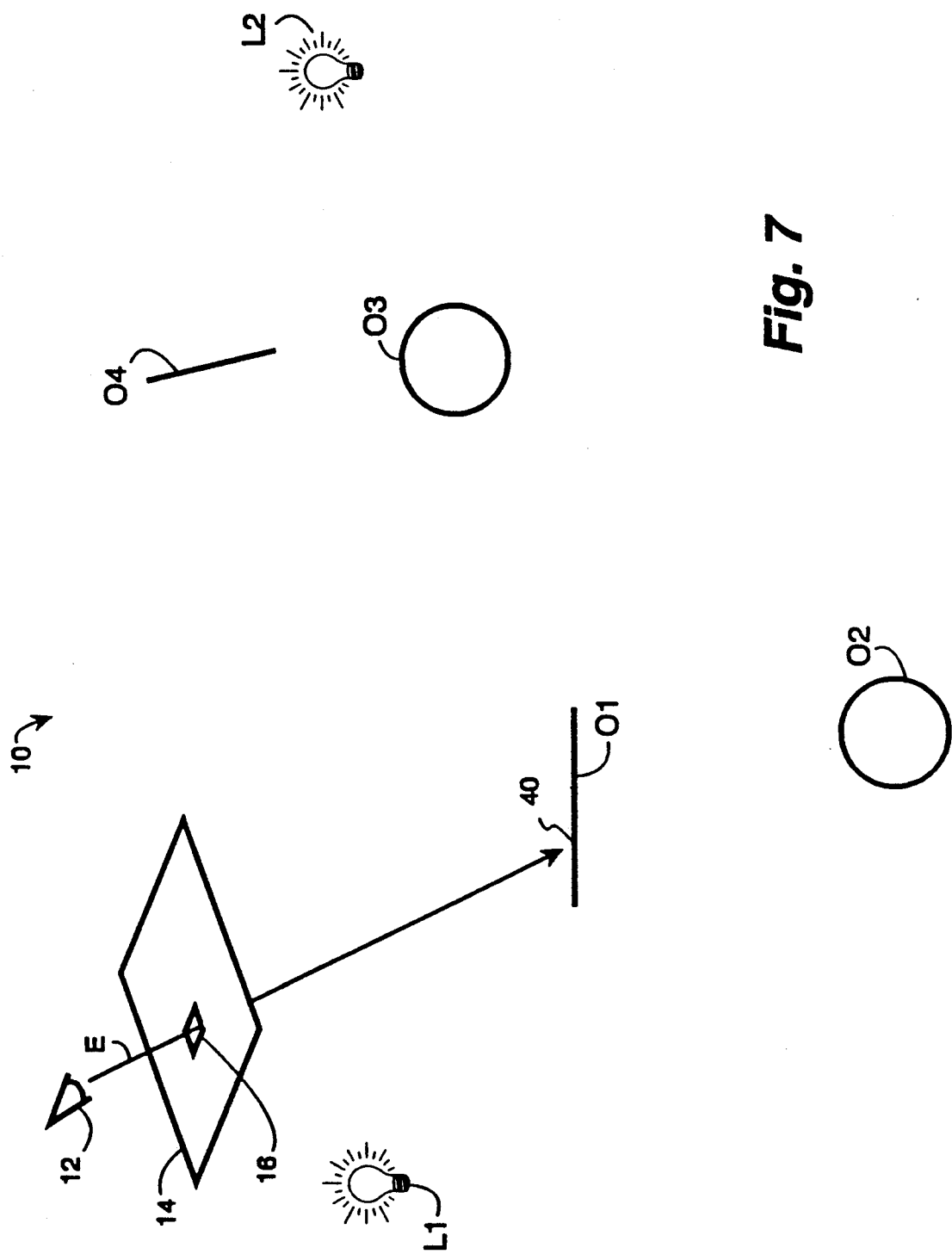

OBJECT-LOCAL SAMPLING HISTORIES FOR EFFICIENT PATH TRACING

BACKGROUND OF THE INVENTION

The present invention is a method for efficiently producing computer generated two-dimensional synthetic images of three-dimensional scenes. Computer graphics research has explored a variety of techniques for the creation of realistic, yet simulated images. In this context, a realistic image would be an image indistinguishable from a photograph of a real, three-dimensional scene. As research has progressed, the continual inclusion of more and more features of real scenes within image generation algorithms (features such as opacity, surface textures, soft shadows) has led to increasingly realistic images.

One of the first successful image synthesis approaches started with the basic physics of lens design. To design and investigate lens properties, one often plots the path taken by rays of light starting at a light source, which then pass through the lens to a focal point. The process of following the light rays is called ray tracing. However, when first developed, the method of ray tracing were computationally intensive and impractical for existing computer resources. Instead, other methods were explored to handle the various different components of image synthesis, such as reflections, shadows, motion blur of fast-moving objects, etc. However, most of these other techniques worked only for special cases and were not easily combined together. Hence, synthetic images might have shadows, but no transparent objects, or reflections but no motion blur.

As increasingly powerful and inexpensive computers evolved, ray tracing algorithms received greater attention. Simulating the actual physics of image generation, through substantial numbers of calculations, became practical and attractive for image synthesis. The methods of ray-tracing algorithms have been augmented with powerful techniques for handling many different kinds of optical phenomena. Current ray-tracing techniques are relatively simple, elegant and easily implemented.

Ray tracing starts with a few basic elements: a three-dimensional scene lit by one or more light sources, a viewing screen comprising an array of pixel elements (a window onto the scene), and a hypothetical viewing eye which looks out on the scene through the viewing screen. The goal of any image synthesis technique is to correctly color each pixel of the viewing screen such that looking at the screen from the vantage of the hypothetical eye would recreate the original three-dimensional scene as closely as possible.

If one uses the actual physics of image generation to trace rays (termed "forward ray tracing"), light emerging from the light sources strikes various objects and boundaries within the scene, often a number of times. Some of the light is absorbed, some is reflected away from the viewing screen, and some light actual strikes the screen through a pixel and enters the eye. This method of forward ray tracing, while it may seen the intuitively correct way to regenerate the scene, is prohibitively difficult and expensive to implement. The problem is that too many of the light rays generated by the light sources are useless: they never manage to reflect off of or pass through surfaces in exactly the way needed to pass through a pixel into the eye. Most of the computational time would be spent examining these useless light rays.

As generally implemented, ray tracing is really backward ray tracing, whereby a backward-going ray from the hypothetical viewing eye passes through a pixel on the viewing screen and strikes an object within the scene to be rendered. By working backwards, one asks the question: "if a ray of light went through this pixel into the eye, from where did it come and what color is it?" Having found the first surface which the backward ray struck, one wants the description of all light striking that point on that surface and then how the incident light is affected by the particular surface characteristics of the struck object. The combined light illumination of the object then can be passed back along the original ray through the particular pixel into the viewer's eye, allowing the pixel to be appropriately shaded. Of course, the different intensities, directions, colors and origins of the light striking the point on the object's surface is infinite; path tracing seeks to sample the light coming from different sources efficiently so that a few samples can replace exhaustively looking at all light rays, while still recovering enough useful information to construct a close estimate of the scene's photometry.

Ray tracing methods are recursive: to find the illumination at a particular object's surface struck by the first backward ray, other backward rays are sent from the object. These rays might strike light sources, providing direct illumination of the surface, or might strike other objects, providing indirect reflected and transmitted light. There are two important problems faced by ray tracing methods. First, because backward-going rays can be continued indefinitely one needs a way of determining when the estimated light incident on a surface is reliable within a certain confidence range. The requirement can be extended to determining when enough rays have been sent through each pixel onto the scene to accurately color each pixel. Both statistical methods and screen-based, pixel assignment algorithms have been implemented to determine when to end each set of ray traces.

As in any form of signal processing, image-synthesis algorithms are also bothered by aliasing effects. Thus, the second principal problem facing ray tracing methods occurs when high-frequency elements in the scene masquerade (or alias) as lower frequency artifacts. A familiar example of aliasing is the moire patterns which occur when numerous thin stripes are viewed on the regular pixel arrays of a television screen, and create broader, lower-frequency stripes. If samples (or backward rays) are taken periodically across the screen at some regular spatial frequency, objects having higher spatial frequencies either can be missed entirely or create aliasing artifacts at lower spatial frequencies.

One technique for reducing aliasing effects in synthetic images (called distributed ray tracing) sends the backward rays from the screen in a Poisson distributed pattern. The random allocation of rays to spatial points on the screen helps to convert regular aliasing artifacts to noise, which is much more acceptable to the human visual system. Dithering and jittering method have been used with some success to randomly sample the image space. The same techniques are also employed in the other dimensions of image synthesis, such as the dimensions of time and light frequency. These methods are principally screen-based, that is, they approach the problem by adequately sampling the screen with backward-going rays distributed randomly in space, time and color.

As discussed above, the backward rays strike objects in the scene to find how to accurately shade that point. To do so, the methods must estimate the total incident light at that point. But incident light combines in a non-uniform way depending upon reflection and transmission functions; the methods attempt to nonuniformly sample the incident light, while at the same time cover the entire reflection and transmission hemispheres, to ensure that there are no large gaps in the sampled regions.

As an example of distributed ray tracing methods, a pixel may be shaded by sending n backward-going rays (or eye rays) through the pixel; each eye ray in the pixel receives a number from 1 to n. When ray number k intersects an object, it needs to generate one or more reflection rays (to sample light that reflected from another object and into the eye). The direction of each of these rays is generally taken from the $k^{th}$ entry of prototype list or template of n direction ranges. Then the exact direction is randomly selected from within that range. A similar process is followed for the transmitted rays. The idea is that when all n rays have been shot, all n regions of the reflection (and transmission) hemisphere will have been sampled. Of course, not all n eye rays will necessarily strike the same object location, so that only some of each location's particular hemisphere will be sampled.

Path tracing presents an alternative to distributed ray tracing, in which in addition to a ray sent to each of the light sources, only one further backward-going ray is sent from an object struck by the first ray. Based on some choice algorithm, the next ray may either be a reflection ray or a transmission ray. The method attempts to save on computational resources by focusing most effort on the early rays (i.e., the initial eye rays and shadow rays) and less on the second, third, etc. rays which bounce from object to object and contribute much less to the final image. Path tracing attempts to sample the reflection and transmission hemispheres as a natural result of many paths arriving at the object. The direction of each sample is chosen from a single reflection function maintained over the lifetime of all eye rays sent from a given pixel.

Both distributed ray tracing and path tracing, as practiced in the prior art, include a shared simplification: the reflectance and transmittance functions are assumed to be the same for all objects in the scene, and thus for all materials as well. The prior art, by picking directions in which to send transmission and reflection rays by reference to a common template list, risks inadequate sampling at the level of individual objects. Further, the directional sampling loses any of the reflection and transmission characteristics peculiar to each surface, since it refers only to a scene-wide template. Distributed ray tracing records the history of shot rays almost entirely at the screen; all previous sampling is forgotten when a new pixel is started. Path tracing uses a global history mechanism, whereby all rays are steered throughout the scene in accordance with a predetermined distribution. In both methods, object-specific reflectance and transmission distributions are ignored.

An improved method of sampling scene information of image synthesis should provide techniques for thoroughly sampling image characteristics in a practical amount of computational time. The method should account for object-specific distributions of reflectance and transmission and for light-source variations. In addition, the method should ensure that a full distribution of image information appropriate for each object can be sampled, without undue waste. The practical and efficient creation of accurate synthetic images from a wider, more realistic range of object and lighting characteristics provided by such a method would satisfy a long felt need within the computer image synthesis community.

SUMMARY OF THE INVENTION

The present invention presents a novel approach for quickly and efficiently sampling information contained in a scene for reconstruction in a computer graphics ray tracing algorithm. The approach first divides up the objects making up a scene into those objects which can emit light and those objects which do not. The objects which do not emit light (light propagating objects) can either reflect light or transmit it. Of course, many light emitting objects can also be light propagating objects, they would merely be combined into a single object representation. The method then divides up each object into any number of discrete regions, each region being a collection of points typically unified by having a common general location, orientation, surface or light emission characteristics, within some determined tolerance. For example, a triangular pyramid made of glass might have four triangular-shaped regions, each with a different position and orientation but having the same surface characteristics of glass.

For a reflective surface, its reflection function may be modeled by a sophisticated set of reflection equations, known as the bi-directional reflectance and transmission functions. The reflection function may be conceptually inverted to provide a distribution of possible directions a light ray may go when it strikes the surface. Depending on the individual surface physics, reflected light rays may cluster more prominently in one direction than another. The method constructs a hemisphere centered on the region, the hemisphere overlaying the reflection function for the region. By any convenient method, the surface of the hemisphere may be subdivided into a collection of solid angles, resulting in a tiling of the hemisphere surface by a collection of closed regions. Each region represents an area of equal probability for light reflection. That is, once a light ray strikes the object region's surface, we can center its reflection hemisphere on the point of incidence, orient the hemisphere so that its 0 degree axis corresponds to the planar projection of the light ray path to the tangent plane of the object surface, and each region on the hemisphere's surface provides an equal amount of light intensity for the reflection function. (At the quantum level, each region represents a solid angle through which the incident photon, once reflected, is equally likely to depart). Those directional areas on the hemisphere where the reflected light is strongest will have the most dense number of regions, those areas where the light is weakest will be the most sparse.

For transmissive surfaces, the process of modeling its transmission function by a hemisphere of regions is essentially the same, except that the regions represent directions of equal probability of transmission. For light emitting object regions, the surface itself will be subdivided into regions of equal probability of light emission.

To keep track of the particular hemisphere on a reflection or transmission region, or the subdivided light emitting regions, each of these object regions is assigned an abstract data structure termed a pack. The pack comprises a collection of elements; these elements have a one-to-one correspondence with the tiled areas of the hemispheres (or for light emitting objects, the subdivided light emitting regions). The ray tracing procedure will use these object regions and their corresponding packs to efficiently sample the set of all possible light paths within the scene, while giving greater emphasis to those light paths carrying the most important information.

The recursive method proceeds as follows. To find the spectral characteristics of a pixel on a screen, one or more backward-going eye rays are sent from the hypothetical viewer eye, through the pixel, until they reach an object in the scene. The eye ray will either strike one of the object regions or keep going until it strikes the scene boundary, which itself may be considered to either absorb the ray (i.e., it produces no light) or to act as another object region in the scene. Once a region is chosen by this backward ray, first, all the light emitting objects in the scene are probed to determine which if any are illuminating that point on the object surface. One by one, each light emitting object is interrogated. This interrogation consists of asking the light emitting object region for an element from its pack. The light emitting region chooses one element that has not yet been marked, marks it and returns it to the pack. If all the elements have been previously marked, they are all unmarked and again one is randomly picked. The picked element determines which point on the light source's surface will be the origin of an illumination ray extending from the light source to the first object region's surface, the point where the initial backward ray struck.

At this point, the origin and direction of the illumination ray have been determined and its spectral characteristics may be calculated by any conventional technique appropriate for that light source. One important aspect of interrogating light sources is to determine, once we have an origin and direction for the illumination ray, whether it can even reach the object region or if it is blocked by another object. If it is not blocked, then it can reach the object region and its spectral information is stored for that object region's surface illumination. The object region now has one representative illumination ray that is temporarily stored at its point. The rest of the light emitting objects are similarly interrogated to get a representative illumination ray streaming from each source to the object region at hand, to determine in an approximate way the overall illumination arriving at that point. Because the method continues to mark the elements for a light emitting object region until all are marked, it ensures that it eventually covers all the possible spatial locations for light sources while still concentrating on those regions most important for producing the light in the scene.

However, direct illumination is not the only way a given object receives its light. Light is also bounced off of other bodies. To analyze this indirect light, the reflection and transmission hemispheres are used. Any light coming from the surface through the pixel into the viewer eye had to be either reflected off of or transmitted through the surface of the object region. The question is then asked, from where could this reflected and/or transmitted light have come? Since the backward going (and therefore "imaginary") ray can be formally treated with exactly the same set of transmission/reflection equations as a forward ("real") ray, the reflection and transmission hemispheres can be used to provide importance sampled regions in space from where the light could have come. The terms "importance sampled" are used because the method looks most often in those directions where the light most probably came and less often in the less likely regions. Thereby both computational time and energy are saved in generating the same quality of an image.

Looking for now at just a reflective object region's surface (a transmissive surface behaves in an analogous fashion), once its reflection hemisphere is oriented on the site where the original backward ray struck, a region of the reflection hemisphere may be chosen at random to indicate where a ray came from, a ray which possibly arrived from another object in the scene. To find a particular region on the hemisphere, the pack of the object region is interrogated for an unmarked element, which is then marked. This element, corresponding to a single surface region of the reflection hemisphere, provides a direction from which the reflected ray came. Because of the way the reflection hemisphere was originally constructed, while each element has an equal likelihood of being picked, more elements will be chosen in those areas from where light is most likely to have come and less elements will be chosen (because they are each larger and more sparse) in those areas from where light is least likely to come. And because the elements for an object region continue to be marked until all are marked, the method ensures that eventually all the possible spatial directions are covered for illumination while still concentrating on those regions which are most likely.

The new backward ray begins at the first object region and continues backwards in the direction given by the chosen element of the pack. This ray will also either strike another object region or the boundary of the scene. At this point the procedure recursively repeats. Again, all the light sources are interrogated for a point on their surfaces to produce an illumination ray pointed at the new object region. And again, one or more backward rays are shot from the second object region's surface, based upon elements chosen from its pack representing its reflection and/or transmission hemisphere. One can continue this tree of illuminations, reflections and transmissions until some threshold is reached. This threshold may be predetermined (i.e., perform the recursion three times) or may be calculated dynamically (i.e., continue going backwards until the light from the last object region contributes less than some arbitrary fraction of the light illuminating the first object region). When the tree of backward light reflections and transmissions is completed, the resulting light rays are summed together going forward. That is, starting at the last object region, all the illumination rays are summed together following conventional light calculational methods and their resultant reflected ray is sent forwards in the direction of the second-to-last object region where this ray is combined with the illumination rays at this second-to-last object region's surface, and any other reflection and transmission rays sent to its surface into one resultant ray which is then sent to the third-to-last object region, and so on.

Working the way back up the tree, the method finally reaches the original object region where method sums the effects of the direct illumination rays striking its surface with the calculated reflected and transmission rays received from the multiple bounces off of the other objects in the scene to provide a single forward-going ray from that object region, through the pixel on the screen, to the eye. If only one such ray per pixel is sent, that ray would determine the color of the pixel. If more are sent, then they would themselves be combined together to provide a resultant pixel color.

The invention, through its novel approach in picking sample illumination, reflection and transmission rays at a local level and in keeping track of which locations or directions have been used at each local region, ensures that the widest possible coverage of the possible light paths is sampled while concentrating the computational effort on those regions where the light paths are most significant. In the case of a light emitting object, the brightest areas are most important and would have the densest number of elements for its pack. In the case of a light reflecting or transmitting object, the hemispheric regions most likely to send reflected or transmitted light are most important and have the densest number of pack elements. By choosing unmarked elements and then marking them and storing these markings, the computational method ensures that the scene will be generated by sampling over all possible regions of light sources and all possible directions in the scene, before regions and directions are repeated.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIG. 7 is a diagrammatic view of a scene to be imaged showing an eye ray.

DETAILED DESCRIPTION OF A PREFERRED EMBODIMENT

Figure 1A:
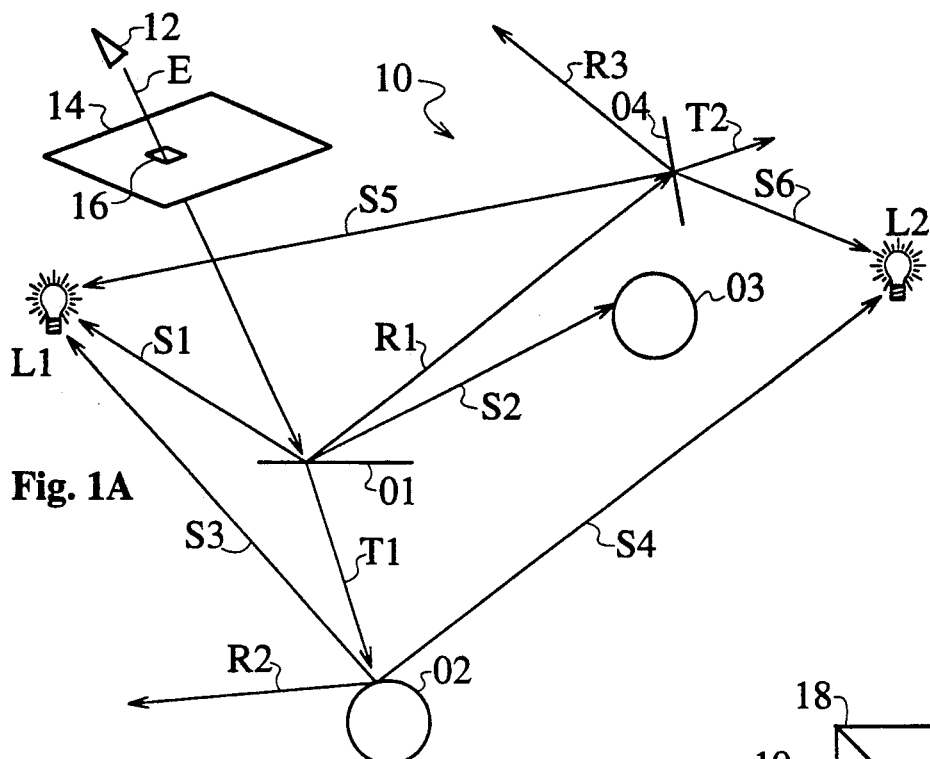
FIG. 1A is a diagrammatic view of a scene to be imaged, including various objects, light sources and ray paths, in accordance with the present invention.

FIG. 1A depicts a scene 10 viewed by an eye 12. The scene 10 includes a screen 14 comprised of subdivided pixel areas 16, light propagating object regions O1 through O4, and light emitting object regions L1 and L2. Object regions O1 and O4 are both reflective and transmissive, while object regions O2 and O3 are only opaque and reflective.

Figure 1B:
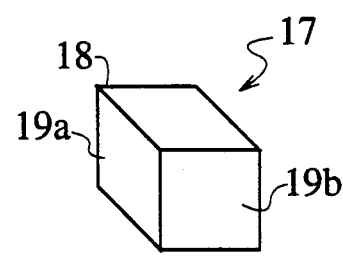
FIG. 1B is an illustration of an object, its surface and several object regions of its surface.
Figure 1C:
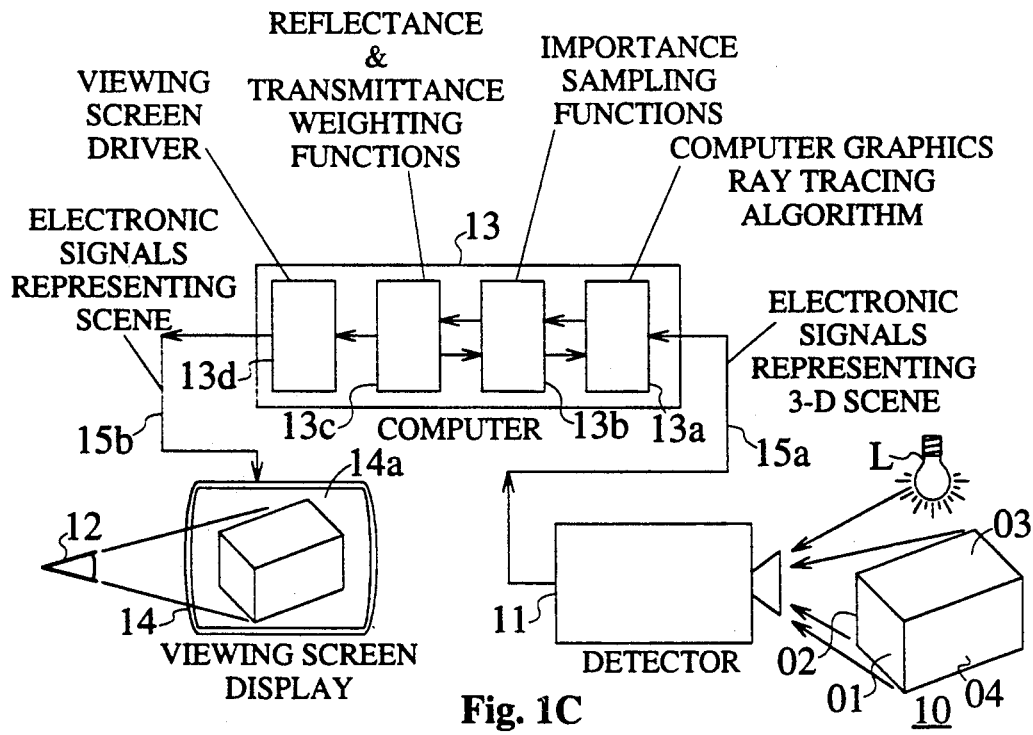
FIG. 1C is a schematic diagram of an apparatus for implementing the invention showing a three-dimensional scene having light rays emerging from a source of illumination and being reflected and transmitted to a detector, and a computer for converting the output the detector into a two-dimensional synthetic image which is displayed on a viewing screen according to the methods of the invention.
Figure 2:
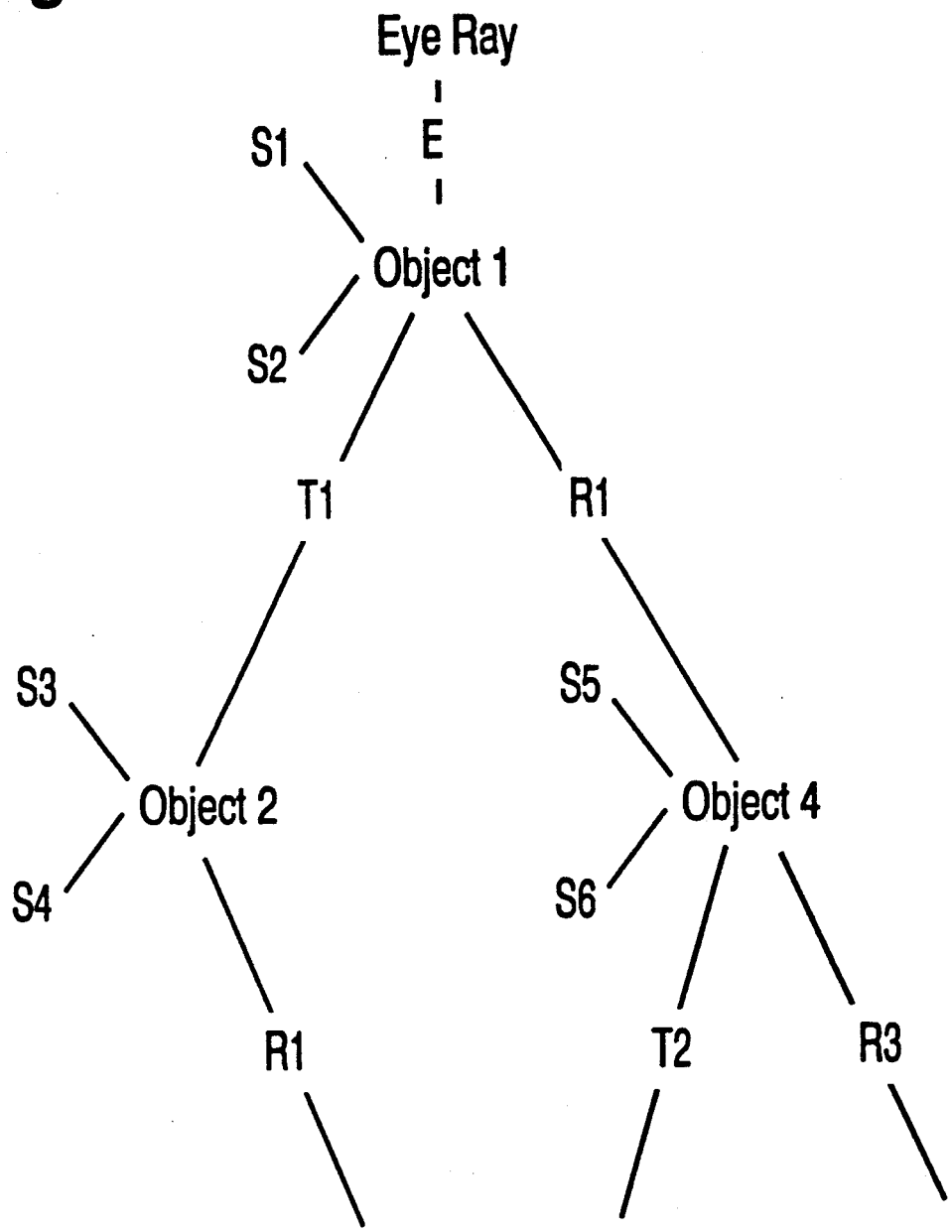
FIG. 2 is a ray tree representation of the scene shown in FIG. 1.

A number of backward-going rays used in the present inventive procedure are also shown in FIG. 1A. Eye ray E, traveling from the pupil of the hypothetical eye 12, passing through pixel 16 in screen 14, strikes a first object region O1. Shadow ray S1 and S2 are sent to the collection of light sources L1 and L2, while a reflection ray R1 and a transmission ray T1 are traced from the struck location on object region O1. These rays strike other object regions, which in turn send out shadow rays, reflection rays and transmission rays, and so on. FIG. 2 displays a schematic tree of the various rays which all lead backwards to the first eye ray E, traversing the space between the pupil and the first object region O1. While the basic structure of the ray tracing shown in FIGS. 1 and 2 is similar to that in conventional distributed ray tracing or path tracing, the present invention includes particularly novel approaches to choosing and assigning individual shadow, transmission and reflection rays when each object surface is struck.

The simplified forms of the object regions in FIG. 1A do not render the methods of the present invention less general. For realistically-shaped objects to be incorporated into the present inventive method, the surfaces of each object should be divided into a number of discrete simplified object regions, each object region being a collection of points typically unified by having common general location, orientation, surface or light emission characteristics, within some determined tolerance. As shown in FIG. 1B, a cubic object 17 of glass might have a surface 18 comprised of 6 square-shaped object regions 19, each with a different position and orientation but having the same surface characteristics of glass. Object O1 of FIG. 1A might therefore represent object region 19a of cubic object 17. The surface of each complex object in a scene may be decomposed into a collection of simplified object regions, all resembling the simple object regions in FIG. 1A. Thus, as used throughout the following description, the term "object region" can subsume both objects 17, their surfaces 18 and discrete portions of object surfaces 19, dependent upon which decomposition of objects is chosen.

Figure 3A:
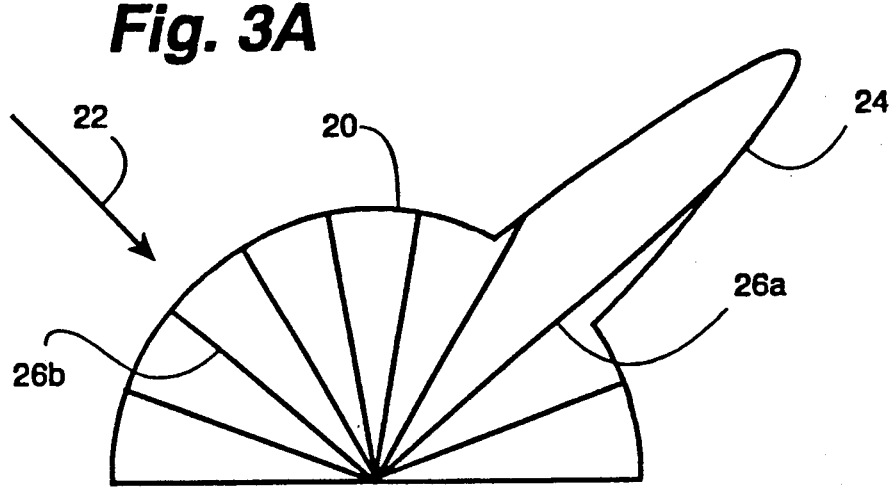
FIG. 3A is a representation of a two-dimensional reflectance model, with weighted but equally spaced sampling.

For a reflective surface, its reflection function may be modeled by a sophisticated set of reflection equations, known as the bi-directional reflectance and transmission functions. The reflection function may be conceptually inverted to provide a distribution of possible directions a backward ray may go when it strikes the surface. Depending on the individual surface physics, reflected light rays may cluster more prominently in one direction than another. A possible reflection function 20 for such a surface is shown in FIG. 3A. An incident ray 22 strikes the center location of the reflection function, and is radiated most prominently in the direction of the function's spike 24. A conventional weighting approach would randomly sample a portion of the reflection hemisphere with a reflection ray 26, where each subdivision of the hemisphere would have an equal likelihood of being sampled. To apply the actual reflectance function, the sum total of light returning along a ray 26a in the prominent portion of the reflectance function would be weighted more heavily (the weight indicated by the length of the ray 26a) than the total of light returning along a ray 26b in a non-prominent portion of the reflectance hemisphere. To summarize, in a conventional weighting approach, rays are shot with equal probability in all directions from an object region's surface; the light received along those directions is weighted by the actual reflectance function.

Figure 3B:
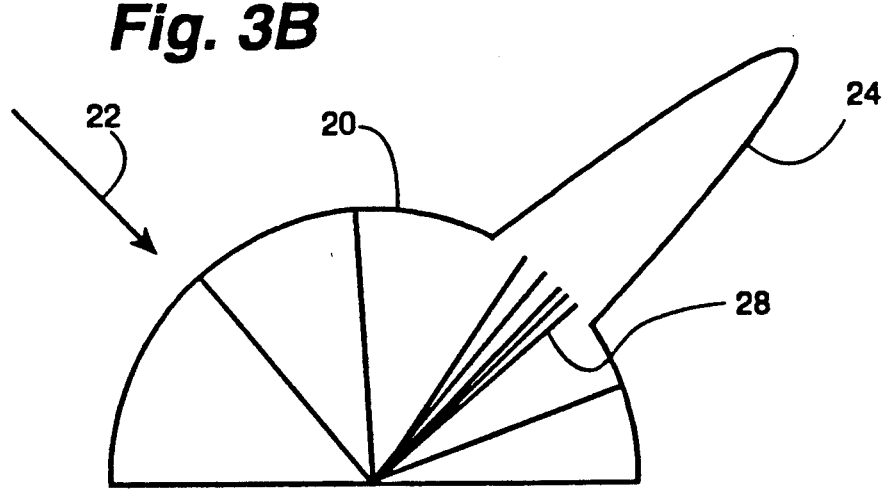
FIG. 3B is a representation of the same two-dimensional model as shown in FIG. 3A, but with importance sampling.

Another technique approaches reflectance functions in a different manner, using an importance sampling approach. Instead of sending differently weighted reflection rays from the object region's surface in different directions with equal probability, equally weighted rays 28 are sent in those directions more likely to be important. The effect is shown in FIG. 3B. Equally weighted rays are more likely to be shot in the prominent directions 24 of the reflectance function, and less likely in the non-prominent directions. Thereby, rays are sent in directions more likely to contribute to the eventual shading of the object region surface. Less-important directions are lightly sampled, wasting less computation resources.

Figure 4A:
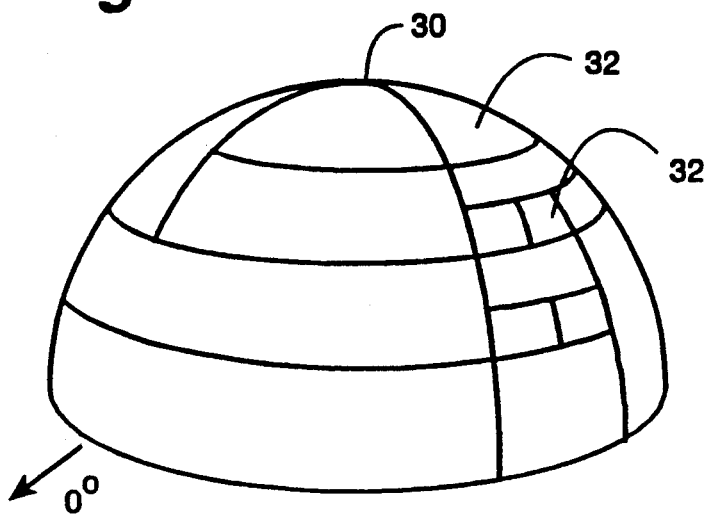
FIG. 4A is a representation of a sampling hemisphere divided into areas of equal importance.
Figure 4B:
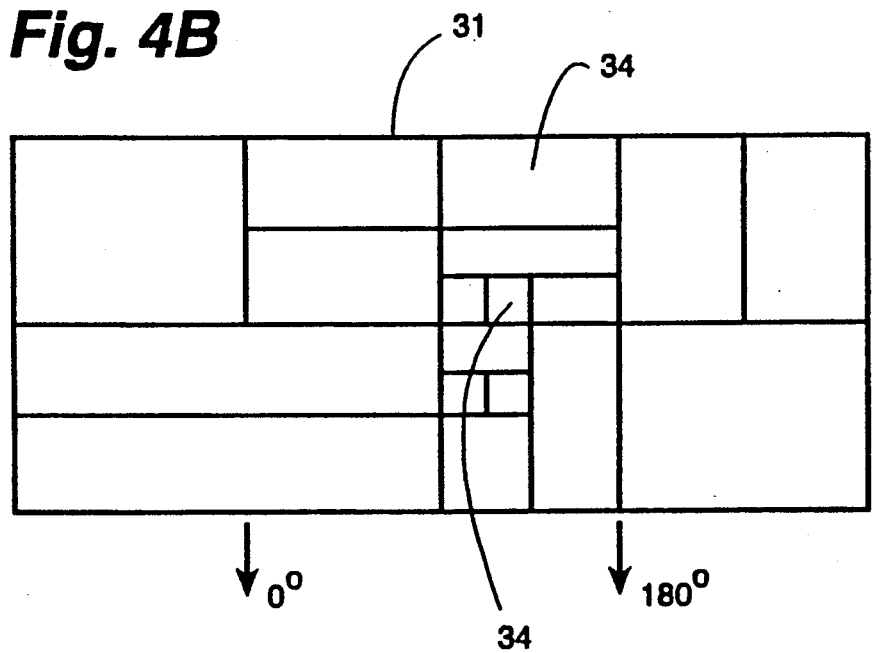
FIG. 4B is a representation of the same sampling hemisphere divided into areas of equal importance, as shown in FIG. 4A, but reduced to a two-dimensional mapping.

The present invention provides novel techniques and data structures for employing importance sampling while keeping track of sampling histories for each object region. The present inventive method constructs a hemisphere 30 centered on the object region, the hemisphere 30 overlaying the reflection function for the region. By any convenient method, the surface of the hemisphere may be subdivided into a collection of solid angles 32 as shown in FIG. 4A, resulting in a tiling of the hemisphere surface by a collection of closed regions. Each region represents an area of equal probability for light reflection. That is, once a light ray strikes the object region's surface, the method centers its reflection hemisphere 30 on the point of incidence, orients the hemisphere so that its 0 degree axis corresponds to the planar projection of the light ray path to the tangent plane of the object region surface, such that each region on the hemisphere's surface provides an equal amount of light intensity for the reflection function. (At the quantum level, each region represents a solid angle through which the incident photon, once reflected, is equally likely to depart). Those directional areas on the hemisphere where the reflected light is strongest will have the most dense number of regions 32, those areas where the light is weakest will be the most sparse. The hemisphere may be converted to a rectangular mapping 31, as shown in FIG. 4B, where each rectangular area 34 has a one-to-one correspondence to an equal-probability area 32 on the reflection hemisphere.

Figure 6A:
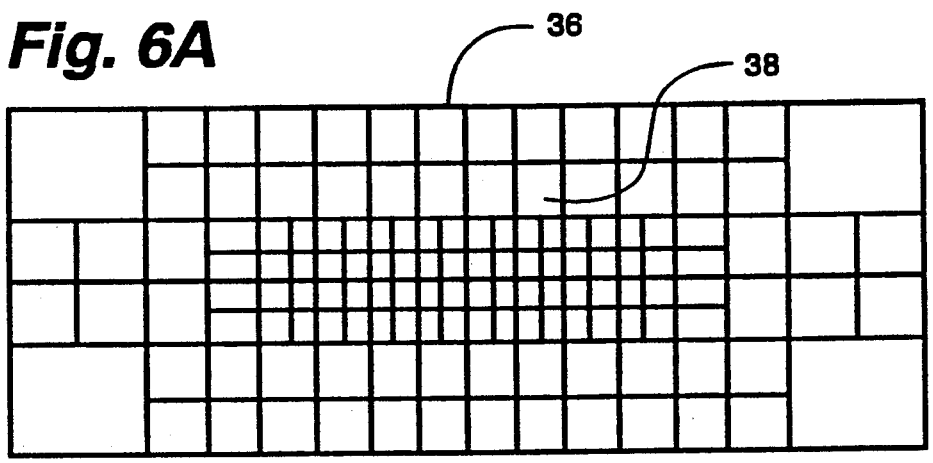
FIG. 6A is a representation of a sampling map for a light source divided into areas of equal importance.

For transmissive surfaces, the process of modeling its transmission function by a hemisphere 30 of regions 32 is essentially the same, except that the regions represent directions of equal probability of transmission. For light emitting object regions, as shown in FIG. 6A, the surface representation 36 of the light source itself will be subdivided into regions 38 of equal probability of light emission. Regions more probable for emitting light on the light source will have a denser number of regions 38.

To keep track of the particular hemisphere on a reflection or transmission region, or the subdivided light emitting regions, each of these object regions is assigned an abstract data structure termed a pack. The pack comprises a collection of elements; these elements have a one-to-one correspondence with the tiled areas 32 of the hemispheres (or for light emitting object regions, the subdivided light emitting regions 38). The ray tracing procedure will use these object regions and their corresponding packs to efficiently sample the set of all possible light paths within the scene, while giving greater emphasis to those light paths carrying the most important information. As each region of a reflection (or transmission) hemisphere for a given object region is selected for sending a reflection ray, the particular element in the corresponding pack will be marked as taken. This can be seen graphically in FIGS. 5A and 5B, where used areas 32b of hemisphere 30 (as well as in the rectangular mapping 31) have been hatched. A similar process for light sources may be seen graphically in FIG. 6B, where areas 38b of the light source 36 having been already used are hatched as unavailable for selection.

Figure 8:
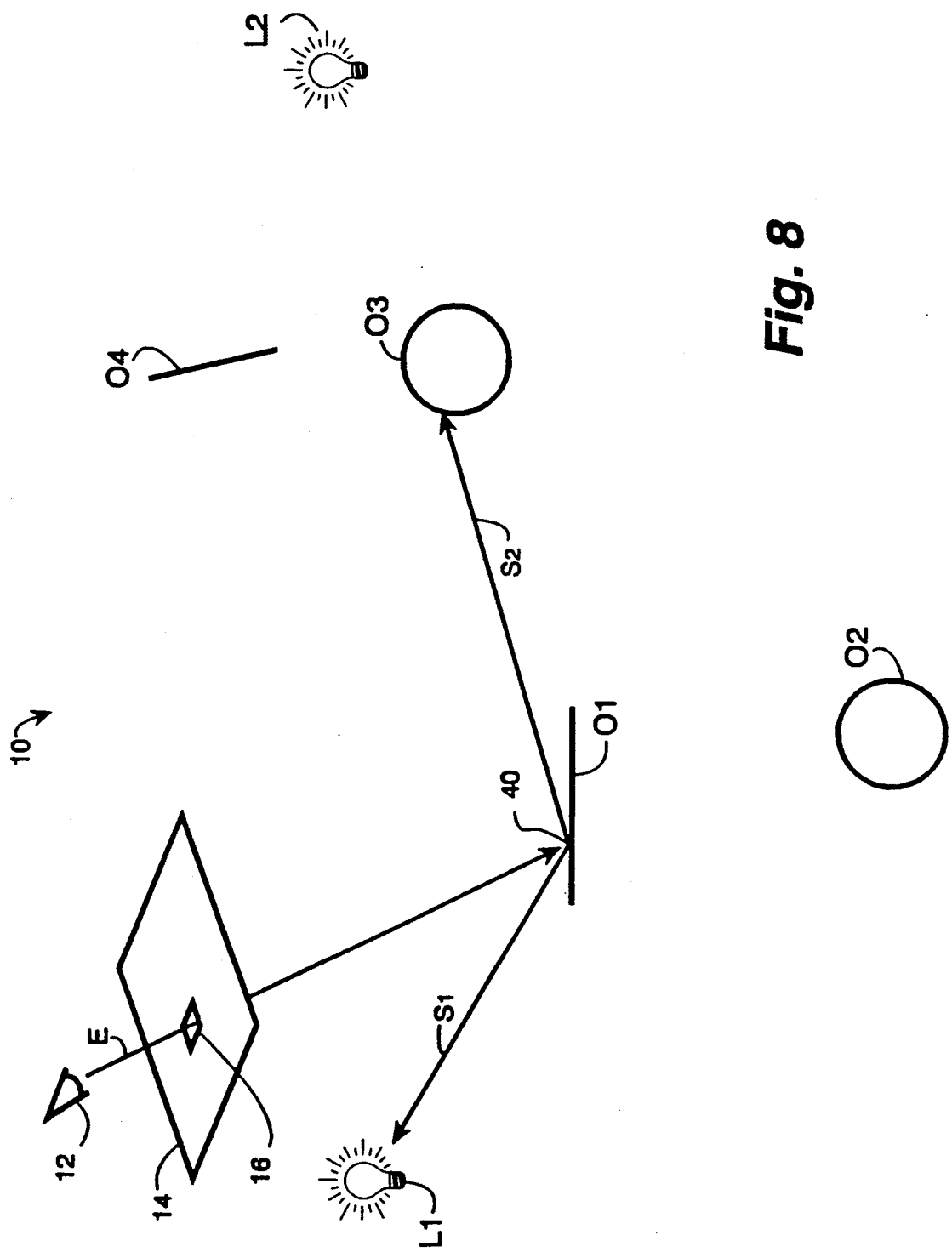
FIG. 8 is a diagrammatic view of a scene to be imaged showing an eye ray and two shadow rays.

The recursive method proceeds as follows. To find the spectral characteristics of a pixel on a screen, one or more backward-going eye rays are sent from the hypothetical viewer eye, through the pixel, until they reach an object region in the scene. The eye ray E will either strike one of the object regions O1, as seen in FIG. 7, or keep going until it strikes the scene boundary, which itself may be considered to either absorb the ray (i.e., it produces no light) or to act as another object region in the scene. Once a region O1 is hit by this backward ray E, first, all the light emitting object regions L1 and L2 in the scene are probed to determine which if any are illuminating that point on the object region surface. One by one, each light emitting object region is interrogated. This interrogation consists of asking the light emitting object region for an element from its pack. The light emitting region chooses one element that has not yet been marked (a blank region 38a from FIG. 6B), marks it and returns it to the pack. If all the elements have been previously marked, they are all unmarked and again one is randomly picked. The picked element determines which point on the light source's surface will be the origin of an illumination ray extending from the light source to the first object region's surface, the point 40 where the initial backward eye ray struck. As seen in FIG. 8, a shadow ray S1 extends from struck location 40 on object region O1 to light source L1. In attempting to reach light source L2, a second shadow ray S2 is blocked by object region O3.

Blocking can occur when sending an initial shadow ray toward the light source. The light source is interrogated for a specific region as the source of the light to be used in the current calculation. Thus, it is possible for a region to be selected from the light source pack of unmarked regions that is in fact blocked by an interfering object region. The region is still marked, but the light available along that particular shadow ray will not be used in calculating the shading for the current eye ray.

Figure 9:
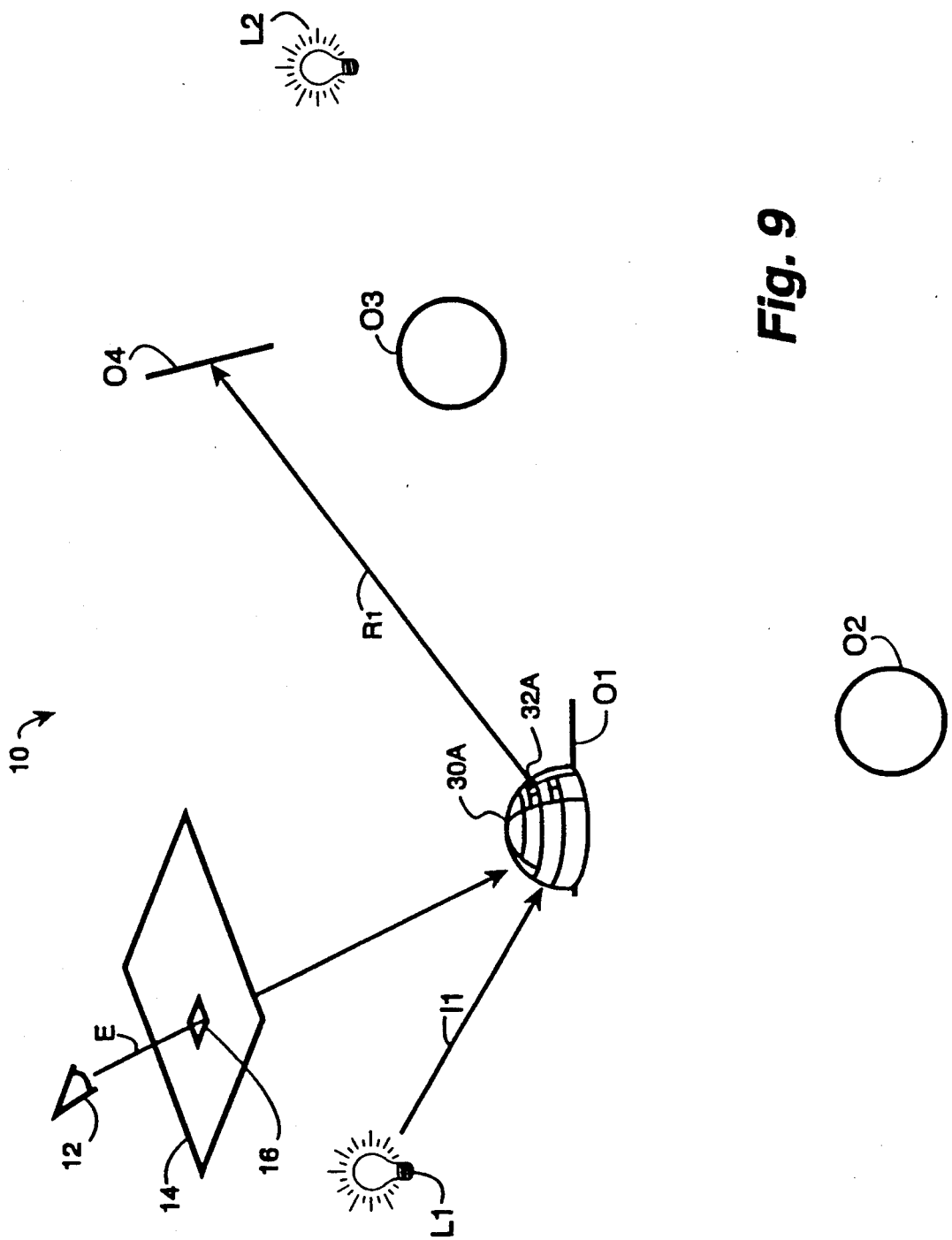
FIG. 9 is a diagrammatic view of a scene to be imaged showing an eye ray, one illumination ray, a reflection hemisphere and a reflection ray.

After determining the region of the light source reached by the particular shadow ray, and marking that region as used in the light source pack (illustrated in FIG. 6B by marked region 38b), the origin and direction of the illumination ray has been determined and its spectral characteristics may be calculated by any conventional technique appropriate for that light source. The resulting illumination ray I1, extending from light source L1 to point 40 on object region O1 is shown in FIG. 9. If the chosen region on the light source is not blocked by an intervening object region, then the illumination ray can reach the object region and its spectral information is stored for that object region's surface illumination. The object region now has one representative illumination ray that is temporarily stored at its point. The rest of the light emitting object regions are similarly interrogated to get a representative illumination ray streaming from each source to the object region at hand, to determine in an approximate way the overall illumination arriving at that point. Because the method continues to mark the elements for each light emitting object region until all are marked, it ensures that it that it eventually covers all the possible spatial locations for light sources while still concentrating on those regions most important for producing the light in the scene.

However, direct illumination is not the only way a given object region receives its light. Light is also bounced off of other bodies. To analyze this indirect light, the reflection and transmission hemispheres are used. Any light coming from the surface through the pixel into the viewer eye had to be either reflected off of or transmitted through the surface of the object region. The question is then asked, from where could this reflected and/or transmitted light have come? Since the backward going (and therefore "imaginary") ray can be formally treated with exactly the same set of transmission/reflection equations as a forward ("real") ray, the reflection and transmission hemispheres can be used to provide importance sampled regions in space from where the light could have come. The terms "importance sampled" are used because the method looks most often in those directions where the light most probably came and less often in the less likely regions. Thereby both computational time and energy are saved in generating the same quality of an image.

Looking for now at just a reflective object region's surface (a transmissive surface behaves in an analogous fashion), once its reflection hemisphere 30A is oriented on the site 40 where the original backward ray struck, a region 32A of the reflection hemisphere 30A may be chosen at random to indicate where a ray came from, a ray which possibly arrived from another object region in the scene. To find a particular region on the hemisphere, the pack of the object region is interrogated for an unmarked element, which is then marked. This element, corresponding to a single surface region 32A of the reflection hemisphere, provides a direction from which the reflected ray came. Because of the way the reflection hemisphere was originally constructed, while each element has an equal likelihood of being picked, more elements will be chosen in those areas from where light is most likely to have come and less elements will be chosen (because they are each larger and more sparse) in those areas from where light is least likely to come. And because the elements for an object region continue to be marked until all are marked, the method ensures that eventually all the possible spatial directions are covered for illumination while still concentrating on those regions which are most likely.

The new backward ray R1 begins at the first object region and continues backwards in the direction given by the chosen element 32A of the pack. This ray will also either strike another object region (in the present example, O4) or the boundary of the scene. At this point the procedure recursively repeats. Again, all the light sources are interrogated for a point on their surfaces to produce an illumination ray pointed at the new object region (the shadow rays S5 and S6 for object region O4 are shown in FIG. 1A). And again, one or more backward rays are shot from the second object region's surface, based upon elements chosen from its pack representing its reflection and/or transmission hemisphere.

Figure 10:
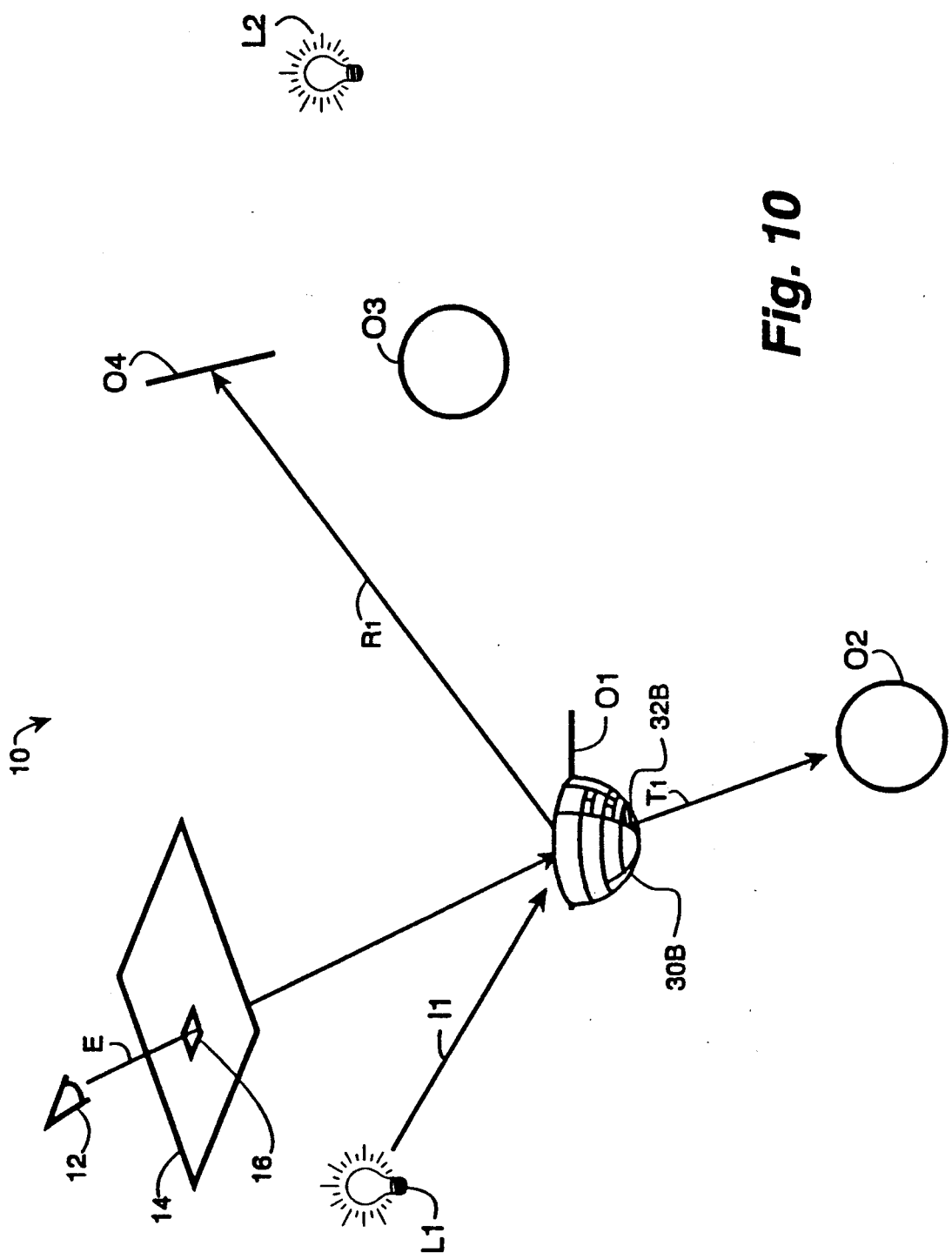
FIG. 10 is a diagrammatic view of a scene to be imaged showing an eye ray, one illumination ray, a reflection ray, a transmission hemisphere and a transmission ray.

Transmission rays are produced in an analogous manner. As shown in FIG. 10, a transmission hemisphere 30B is centered on the struck location 40 of object region O1, and an unmarked region 32B is selected from the object region's transmission hemisphere pack. A transmission ray T1 is then sent from point 40 in the direction given by area 32B. Depending upon whether the transmission ray T1 strikes another object region or the boundary of the scene, the same iterative process may begin as described for the reflection ray.

The present inventive methods of choosing transmission, reflection and shadow rays are adaptable to any particular algorithm for ray tracing. For example, path tracing typically selects only one backward going ray in addition to the shadow rays. The single ray might be either a transmission ray or a reflection ray, but only one is chosen. The same methods described here may be employed to select that ray's direction. For a surface that is both reflective and transmissive, the two hemispheres might be joined to form a general sphere combining the probabilities that a light ray is either reflected or transmitted in any given direction in space. It is also valuable to note that the same methods used in distributed ray tracing for jittering a ray within a pixel can be used in the present invention to jitter the final direction of any ray, once a particular transmission or reflection hemisphere area is chosen (or, in the case of light sources, once a particular light area is selected). Thus, a further randomness of selection can be introduced to adequately distribute rays throughout the scene, while still concentrating on important areas most.

One can continue the tree of illuminations, reflections and transmissions extending from the initial eye ray until some threshold is reached. This threshold may be predetermined (i.e., perform the recursion three times) or may be calculated dynamically (i.e., continue going backwards until the light from the last object region contributes less than some arbitrary fraction of the light illuminating the first object region). When the tree of backward light reflections and transmissions is completed, the resulting light rays are summed together going forward. That is, starting at the last object region, all the illumination rays are summed together following conventional light calculational methods and their resultant reflected ray is sent forwards in the direction of the second-to-last object region where this ray is combined with the illumination rays at this second-to-last object region's surface, and any other reflection and transmission rays sent to its surface into one resultant ray which is then sent to the third-to-last object region, and so on.

Working the way back up the tree, the method finally reaches the original object region where the method sums the effects of the direct illumination rays L1 striking its surface with the calculated reflected and transmission rays R1 and T1 received from the multiple bounces off of the other object regions in the scene to provide a single forward-going ray from that object region, through pixel 16 on screen 14, to the eye 12. If only one such ray per pixel is sent, that ray would determine the color of the pixel. If more are sent, then they would themselves be combined together to provide a resultant pixel color.

The invention, through its novel approach in picking sample illumination, reflection and transmission rays at a local level and in keeping track of which locations or directions have been used at each local region, ensures that the widest possible coverage of the possible light paths is sampled while concentrating the computational effort on those regions where the light paths are most significant. In the case of a light emitting object region, the brightest areas are most important and would have the densest number of elements for its pack. In the case of a light reflecting or transmitting object region, the hemispheric regions most likely to send reflected or transmitted light are most important and have the densest number of pack elements. By choosing unmarked elements and then marking them and storing these markings, the computational method ensures that the scene will be generated by sampling over all possible regions of light sources and all possible directions in the scene, before regions and directions are repeated. The packs associated with each object region are maintained over multiple eye rays, enabling long-term complete sampling over all relevant scene dimensions.

The disclosed methods and apparatus for object-local sampling histories for efficient path tracing of images are applicable to any ray or path tracing application. In particular, although the present embodiment has been described with reference to a single reflected and transmitted ray, and to only one shadow ray per light source, the same inventive procedures may be readily applied to any number of rays to any number of objects. In addition, the same technique of assigning an abstract data structure, or pack, to various objects can be extended to other scene dimensions. For instance, a period of time (for simulating motion), any lens characteristic (such as depth of field, curvature), or spectral frequency (for sampling colors), can all be sampled by the same general method. To do so, the range of a given dimension is distributed to a pack, whose elements correspond to importance-weighted subranges of the dimension. For instance, both the area distribution and the color distribution of a light source could have their own pack of elements to sample. Interrogating the particular pack picks an unselected element, until all elements are selected, when all elements are unmarked and the process begins again. The inventive procedure assures that the relevant range of a given sampling dimension is fully sampled, while devoting more effort to the more important subranges.

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

Figure 5A:
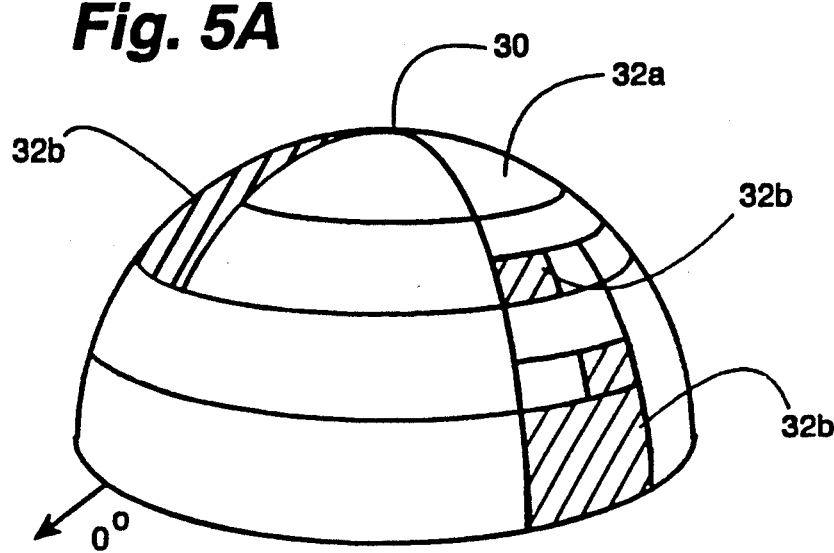
FIG. 5A is a representation of a sampling hemisphere divided into areas of equal importance, where certain areas have already been selected and are no longer available.
Figure 5B:
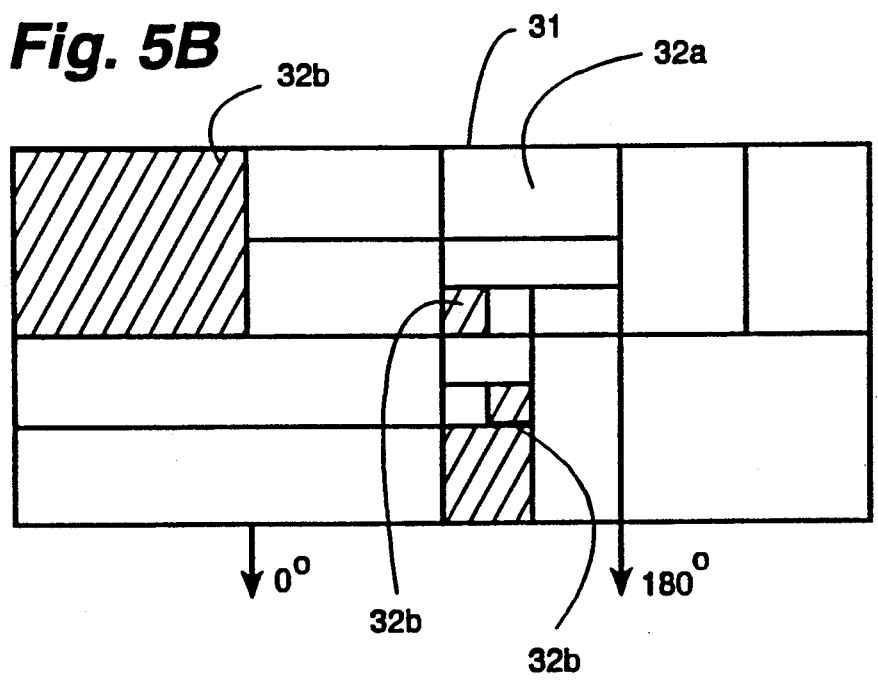
FIG. 5B is a representative of the same sampling hemisphere divided into areas of equal importance, as shown in FIG. 5A, but reduced to a two-dimensional mapping, having several areas already selected.
Figure 6B:
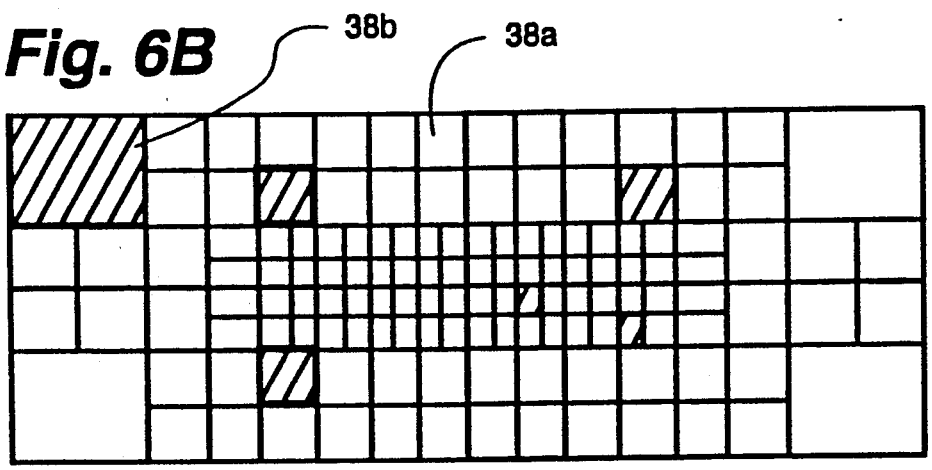
FIG. 6B is a representation of a sampling map for a light source divided into areas of equal importance, where certain areas have already been selected and are no longer available.

FIGS. 1A, 1B and 1C
  10 Scene to be imaged
  11 Detector
  12 Viewing eye
  13 Computer
  13a Computer graphics ray tracing algorithm
  13b Importance sampling functions
  13c Reflectance and transmittance weighting functions
  13d Viewing screen driver
  14 Viewing screen
  14a Two dimensional synthetic image
  15a Electronic signals representation of three-dimensional scene
  15b Electronic signals representation of two dimensional synthetic image of three dimensional scene
  16 Pixel
  17 Cubic Object
  18 Surface of Cubic Object
  19 Individual Object Regions of Cubic Object
  19a First Object Region of Cubic Object
  19b Second Object Region of Cubic Object
  E eye ray
  O1-4 Object Regions within scene
  L1-2 Light sources
  S1-6 Shadow rays
  R1-3 Reflection rays
  T1-2 Transmission rays
FIGS. 3A and 3B
  20 Reflection function
  22 Incident ray
  24 Reflection function spike
  26 Unequally weighted, equally distributed Reflection rays
  28 Equally weighted, unequally distributed Reflection rays
FIGS. 4A and 4B
  30 Reflection hemisphere
  31 Rectangular mapping of reflection hemisphere
  32 Equal-probability areas
  34 Equal-probability areas on rectangular mapping of reflection hemisphere
FIGS. 5A and 5B
  32a Unmarked equal-probability areas on reflection hemisphere
  32b Marked equal-probability areas on reflection hemisphere
FIGS. 6A and 6B
  36 Light distribution surface
  38 Equal-probability light emitting areas
  38a Unmarked light emitting areas
  38b Marked light emitting area
FIG. 7
  40 Strike location on object region
FIG. 9
  30A Object-local reflection hemisphere
  32A Marked equal-probability area
FIG. 10
  30B Object-local transmission hemisphere
  32B Marked equal-probability area

I claim:

1. A method of randomly sampling information obtained from a ray tracing algorithm (13c), which algorithm creates a tree of rays extending from a viewing eye (12) to a first object region (O1) and from there to other object regions (O2, O3, O4) and to light sources (L, L1, L2) of a three-dimensional scene (10) for each pixel (16) of a plurality of pixels, in order to produce a brightness and color for each said pixel (16), in a system for producing a computer-generated two-dimensional synthetic image (14a) composed of said plurality of pixels, from said three-dimensional scene (10) said system having a detector (11), a computer (13) which implements said ray-tracing algorithm (13c) and a viewing screen (14) driven by said computer (13) to display said two-dimensional synthetic image (14a), comprising the steps of:

(a) providing said three-dimensional scene (10), said three-dimensional scene (10) containing at least one object (17), said object (17) having at least one surface (18), said three-dimensional scene (10) having a boundary;

(b) subdividing said surface (18) of said object (17) into a plurality of object regions (O1, O2, O3, O4);

(c) assigning to each one of said object regions (O1, O2, O3, O4) a hemisphere (30) centered on each one of said object regions (O1, O2, O3, O4), said hemisphere (30) subdivided into a plurality of sundry closed regions (32), each one of which said sundry closed regions (32) is a solid angle centered respectively on one of said object regions (O1, O2, O3, O4), each one of said sundry closed regions (32, 38) providing an equal amount of light intensity determined by a reflection function for each one of said object regions (O1, O2, O3, O4) which is a reflecting region, said light intensity determined by a transmission function for each one of said object regions (O1, O2, O3, O4) which is a transmitting region, and said light intensity determined by an emission function for each one of said object regions (O1, O2, O3, O4) which is an emitting region;

characterizing said plurality of sundry closed regions (32, 38) by an abstract data structure termed a pack, said pack having a plurality of elements each one of said plurality of elements corresponding to one of said sundry closed regions (32, 38) and representing an equally weighted but unequally distributed light ray (28); said plurality of elements being identified as unmarked elements (32a, 38a) and therefore being available for sampling, or marked elements (32b, 38b) and therefore being unavailable for sampling;

(d) sending a ray (E) from said viewing eye (12) through said pixel (16) to a strike location point (40) on said surface (18) of an ith object region (O1) of a plurality of object regions (O1, O2, O3, O4) as a first step in determining which ray (R1, T1, S1) will strike other object regions and light sources (L1, L2): then interrogating an ith object region (O1) of said plurality of object regions (O1, O2, O3, O4), said ith object region (O1) having been characterized by a said pack, where said interrogation includes:
asking said ith object region (O1) for one of said unmarked elements (32a, 38a) from said pack characterizing said ith object region (O1);
marking said one of said unmarked elements (32a, 38a), but if every one of said elements of said pack is already marked, then unmarking every one of said marked elements (32b), and randomly choosing and marking one of said unmarked elements (32a) making it a chosen and marked element (32b);

(e) sending a ray (R1) from said ith object region (O1) to a jth object region (O4), an origin and direction of said ray (R1) determined by said chosen and marked element (32b) from said pack which characterizes said ith object region (O1), but if said ray (R1) does not extend toward said jth object region (O4), then sending said ray (R1) from said ith object region (O1) to said boundary of said scene (10);

(f) repeating steps (d) and (e) for each said pixel (16) in said two-dimensional image (14a) and until an arbitrary interrogation threshold of ray (R1) distribution has been reached and said tree of rays of light reflection and transmission is thereby completed; and (g) summing together for each said pixel (16), spectral characteristics of each said ray (R1) resulting from steps (a) through (f) beginning with said jth object region (O4) and proceeding to said ith object region (O1) along said tree of rays of light reflections and transmissions:

(h) whereby a brightness and a color are determined for each said pixel (16) of which said two-dimensional synthetic image (14a) is composed.

2. The method as recited in claim 1 in which at least one object region of said plurality of object regions is a light emitting object region (L1).

3. The method as recited in claim 1 in which at least one object region (O1) of said plurality of object regions is a light reflecting object region (O1).

4. The method as recited in claim 1 in which at least one object region (O1) of said plurality of object regions is a light transmitting object region (O1).

5. The method as recited in claim 2 in which each one of said elements of a pack characterizing said light emitting object region (L1) corresponds to a generally equal probability area (38) for emitting light for a portion of said light emitting object region (L1).

6. The Method as recited in claim 3 in which each one of said elements of a pack characterizing said light reflecting object region (O1) corresponds to a generally equal probability area (32) for reflecting light for said light reflecting object region (O1).

7. The Method as recited in claim 4 in which each one of said elements of a pack characterizing said light transmitting object region (O1) corresponds to a generally equal probability area (32) for transmitting light for said light transmitting object region (O1).

8. A method of determining a set of spectral characteristics of a first backward ray (E) obtained from a ray tracing algorithm (13c), which algorithm creates a tree of rays extending from a viewing eye (12) to a first object region (O1) and from there to other object regions (O2, O3, O4) and to light sources (L, L1, L2) of a three-dimensional scene (10) for each pixel (16) of a plurality of pixels, in order to produce a brightness and color for each said pixel (16), in a system for producing a computer-generated two-dimensional synthetic image (14a) composed of said plurality of pixels, from said three-dimensional scene, said system having a detector (11), a computer (13) which implements said ray-tracing algorithm (13c) and a viewing screen (14) driven by said computer (13) to display said two-dimensional synthetic image (14a), comprising the steps of:

(a) providing said three-dimensional scene (10), said three-dimensional scene (10) having at least one light propagating object (17), said scene (10) having at least one light emitting object (L), said light propagating object (17) and said light emitting object (L) having at least one surface (18), said three-dimensional scene (10) having a boundary;

(b) subdividing said surface (18) of said light propagating object (17) and said surface (18) of said light emitting object (L) into a plurality of object regions (O1, O2, O3, O4, L1, L2);

(c) assigning to each one of said object regions (O1, O2, O3, O4, L1, L2) a hemisphere (30) centered on each one of said object regions (O1, O2, O3, O4, L1, L2), said hemisphere (30) subdivided into a plurality of sundry closed regions (32, 38), each one of which said sundry closed regions (32, 38) is a solid angle centered respectively on one of said object regions (O1, O2, O3, O4, L1, L2), each one of said sundry closed regions (32, 38) providing an equal amount of light intensity determined by a reflection function for each one of said plurality of object regions (O1, O2, O3, O4, L1, L2) which is a reflecting region, said light intensity determined by a transmission function for each one of said plurality of object regions (O1, O2, O3, O4, L1, L2) which is a transmitting region, and said light intensity determined by an emission function for each one of said plurality of object regions (O1, O2, O3, O4, L1, L2) which is an emitting region; characterizing said plurality of sundry closed regions (32, 38) by an abstract data structure termed a pack, said pack having a plurality of elements each one of said plurality of elements corresponding to one of said plurality of sundry closed regions (32, 38) and representing an equally weighted but unequally distributed light ray (28); each one of said plurality of elements being identified as an unmarked element (32a, 38a), and therefore being available for sampling, or identified as a marked element (32b, 38b), and therefore being unavailable for sampling;

(d) following said first backward ray (E) from said viewing eye (12) through said pixel (16) to a strike location point (40) on said surface (18) of a first member (O1) of a plurality of light propagating object regions (O1, O2, O3, O4) as a first step in determining which ray (S1) of a said light emitting object (L) illuminates said strike location point (40); then (e) interrogating a member (L1) of a plurality of light emitting object regions (L1, L2), said member (L1) having been characterized by a said pack, where said interrogation includes:

asking said member (L1) of said plurality of light emitting object regions (L1, L2) for a said unmarked element (38a) from said pack of said member (L1);

marking said unmarked element (38a), but if every one of said elements of said pack is already marked, then unmarking all of said marked elements (38b) and choosing and marking one of said unmarked elements (38a) which becomes a chosen and marked element (38b);

(f) sending an illumination ray (I1) from said member (L1) toward said first light propagating object region (O1), said illumination ray (I1) having an origin determined by said chosen and marked element (38b) from said pack of said member (L1);

(g) determining whether said illumination ray (I1) can reach said strike location point (40) on said first light propagating object region (O1) without striking another, intervening light propagating object region, and if said illumination ray (I1) can reach said strike location point (40) on said first light propagating object region (O1), then temporarily storing a direction and a set of spectral characteristics of said illumination ray (I1);

(h) repeating steps e through g for each remaining one of said plurality of light emitting object regions (L1, L2) and for each pixel (16) of said two-dimensional synthetic image (14a) until a last light emitting object region (L2) has been interrogated, and spectral characteristics stored for a last resulting illumination ray (I1);

(i) interrogating a first light propagating object region (O1), said first light propagating object region having been assigned a said pack, where said interrogation includes:

asking said first first light propagating region (O1) for one of said unmarked elements (32a) from said pack of said first first light propagating region (O1);

marking said unmarked element (32a), but if every one of said elements of said pack is already marked, then unmarking all of said marked elements (32b) and choosing and marking one of said unmarked elements (32a) which becomes a chosen and marked element (32b);

(j) sending a second backward ray (R1) from said first light propagating object region (O1) to a second light propagating object region (O4), a direction of said second backward ray (R1) determined by said chosen and marked element (32b) from said pack of said first light propagating object region (O1), but if said second backward ray (R1) does not extend toward said second light propagating object region (O4) then sending said second backward ray (R1) from said first light propagating object region (O1) to said boundary of said three dimensional scene (10).

(k) repeating steps (i) and (j) for each pixel (16) and until an arbitrary interrogation threshold of light ray (R1) distribution has been reached, and said tree of rays of light reflection and transmission is thereby completed; and (l) integrating for each said pixel (16) said stored spectral characteristics of each said illumination ray (I1) resulting from steps (a) through (g) beginning with said first illumination ray (I1) and proceeding to said last illumination ray, and each backward ray (R1) resulting from steps (j) through (k), beginning with a last object region (O4) and proceeding forward to said first object region (O1) along said tree of rays of light reflections and transmissions;

(m) whereby said spectral characteristics are determined for each said pixel (16) of which said two-dimensional synthetic image (14a) is composed.

9. The method as recited in claim 8 further comprising the steps of:

(a) following an nth backward ray from said viewing eye (12) through said pixel (16) to a strike location point (40) on said surface (18) of an nth member of said plurality of light propagating object regions (O1, O2, O3, O4) as a first step in determining which ray of a plurality of light emitting objects (L1, L2) illuminates said strike location point (40); then (b) interrogating an nth member of said plurality of light emitting object regions, said nth member having been characterized by a said pack, where said interrogation includes:

asking said nth member of said plurality of light emitting object regions (L1, L2) for a said unmarked element (38a) from said pack of said nth member;

marking said unmarked element (38a), but if every one of said elements of said pack is already marked, then unmarking all of said marked elements (38b) and choosing and marking one of said unmarked elements (38a) which becomes a chosen and marked element (38b);

(c) sending an illumination ray from said nth member toward said nth light propagating object region, said illumination ray having an origin determined by said chosen and marked element (38b) from said pack of said nth member;

(d) determining whether said illumination ray (I1) can reach said strike location point (40) on said nth light propagating object region without striking another, intervening light propagating object region, and if said illumination ray can reach said strike location point on said nth light propagating object region, then temporarily storing a direction and a set of spectral characteristics of said illumination ray;

(e) repeating steps b through d for each remaining one of said plurality of light emitting object regions (L1, L2) until a last object region (L2) has been interrogated, and spectral characteristics stored for a last resulting illumination ray;

(f) interrogating said nth light propagating object region, said nth light propagating object region having been assigned a said pack, where said interrogation includes:

asking said nth light propagating object region for a said unmarked element (32a) from said pack of said nth light propagating object region;

marking said unmarked element (32a), but if every one of said elements of said pack is already marked, then unmarking all of said marked elements (32b) and choosing and marking one of said unmarked elements (32a), which becomes a chosen and marked element (32b);

(g) sending an n+1th backward ray from said nth light propagating o region to an n+1th light propagating object region, a direction of said n+1th backward ray determined by said chosen and marked element (32b) from said pack of said nth light propagating object region, but if said n+1th backward ray does not extend toward said n+1th light propagating object region then sending said n+1th backward ray to said boundary of said three dimensional scene (10).

(h) repeating steps b through g where n is equal to n+1, and if n equals a predetermined number J, then stopping and repeating steps b through g, but if one of said backward rays strikes said boundary of said three dimensional scene (10), then also stopping and repeating steps b through g;

(i) integrating said stored spectral characteristics of said illumination rays at an Nth light propagating object region and attaching said integrated spectral characteristics to an Nth forward ray, said Nth forward ray having an opposite direction to a previously chosen Nth backward ray, said Nth forward ray extending from said Nth light propagating object region to an N−1th light propagating region, where N is equal to J;

(j) storing said integrated spectral characteristics of said Nth forward ray at said N−1th light propagating object region;

(k) integrating said stored spectral characteristics of said illumination rays at said N−1th light propagating object region and said stored integrated spectral characteristics of said Nth forward ray at said N−1th light propagating object region and attaching said integrated spectral characteristics to a N−1th forward ray, said N−1th forward ray having an opposite direction of a previously chosen N−1th backward ray, said N−1th forward ray extending from said N−1th light propagating object region to an N−2th light propagating object region;

(l) repeating steps j and k where N is equal to N−1 until N−1 is equal to 1; and (m) assigning a set of integrated spectral characteristics of an N−1th forward ray to said first backward ray (E), where N−1 is equal to 1; and (n) repeating steps a through m for each said pixel (16) of said two-dimensional synthetic image (14a), whereby said spectral characteristics are determined accurately for each said pixel (16) of which said two-dimensional synthetic image (14a) is composed.

10. The method as recited in claim 8 in which said light propagating object is capable of reflecting light.

11. The method as recited in claim 8 in which said light propagating object is capable of transmitting light.

12. The method as recited in claim 10 in which each element of said pack of said light propagating object comprises a generally equal probability region of solid angle for reflecting light for said object region.

13. The method as recited in claim 11 in which each element of said pack of said light propagating object comprises a generally equal probability region of solid angle for transmitting light for said object region.

14. The method as recited in claim 8 in which each element of said pack of said light emitting object comprises a generally equal probability region for emitting light for a portion of said light emitting object.

* * * * *